United States Patent
Zlotnikov et al.

(10) Patent No.: US 8,262,253 B2
(45) Date of Patent: Sep. 11, 2012

(54) LIGHTING METHOD AND SYSTEM

(75) Inventors: Vadim Zlotnikov, Dallas, TX (US); William Elliott, Grand Prairie, TX (US); Kent Solberg, Murphy, TX (US); Larry T. Taylor, Blue Ridge, TX (US); Louis Pollaehn, Princeton, TX (US); Valeriy K. Berger, Plano, TX (US); Dan Kelleher, Plano, TX (US); Marty Masias, Tom Bean, TX (US); John B. Gunter, Flower Mound, TX (US); George Berman, Plano, TX (US)

(73) Assignee: Luminator Holding LP, Plano, TX (US)

( * ) Notice: Subject to any disclaimer, the term of this patent is extended or adjusted under 35 U.S.C. 154(b) by 43 days.

(21) Appl. No.: 12/596,083

(22) PCT Filed: May 2, 2008

(86) PCT No.: PCT/US2008/005689
§ 371 (c)(1),
(2), (4) Date: Aug. 24, 2010

(87) PCT Pub. No.: WO2008/137076
PCT Pub. Date: Nov. 13, 2008

(65) Prior Publication Data
US 2011/0038149 A1 Feb. 17, 2011

Related U.S. Application Data

(60) Provisional application No. 60/927,218, filed on May 2, 2007, provisional application No. 61/047,882, filed on Apr. 25, 2008.

(51) Int. Cl.
*F21V 5/00* (2006.01)
(52) U.S. Cl. .................. 362/245; 362/247; 362/249.02; 362/296.01; 362/311.02; 362/341
(58) Field of Classification Search ................. 362/245, 362/247, 249.02, 296.01, 307–308, 311.01–311.02, 362/326, 328, 341, 343, 800
See application file for complete search history.

(56) References Cited

U.S. PATENT DOCUMENTS

| | | | |
|---|---|---|---|
| 5,274,955 A | 1/1994 | Dallaire et al. | |
| 6,094,292 A | 7/2000 | Goldner et al. | |

(Continued)

FOREIGN PATENT DOCUMENTS

CN 2690723 Y 4/2005
(Continued)

OTHER PUBLICATIONS

Young, Lee W., International Search Report for PCT/US08/05689 as mailed Aug. 8, 2008 (3 pages).

*Primary Examiner* — Stephen F Husar
*Assistant Examiner* — Meghan Dunwiddie
(74) *Attorney, Agent, or Firm* — Winstead PC

(57) ABSTRACT

A lighting system including a light-emitting diode cradle securing at least one light-emitting diode and a modular unit comprising an arcuate portion, the arcuate portion comprising at least one diffusive reflective surface adapted to receive and reflect light from the at least one light-emitting diode. The lighting system further includes a diffusive transmissive element adapted to receive light reflected by the diffusive reflective surface and provide diffused light to an area requiring illumination.

20 Claims, 9 Drawing Sheets

U.S. PATENT DOCUMENTS

| | | |
|---|---|---|
| 6,451,027 B1 | 9/2002 | Cooper et al. |
| 6,786,625 B2 | 9/2004 | Wesson |
| 6,803,732 B2 | 10/2004 | Kraus et al. |
| 6,860,621 B2 | 3/2005 | Bachl et al. |
| 6,890,085 B2 | 5/2005 | Hacker |
| 7,045,965 B2 | 5/2006 | Li et al. |
| 7,059,731 B2 | 6/2006 | Lee et al. |
| 7,071,762 B2 | 7/2006 | Xu et al. |
| 7,072,096 B2 | 7/2006 | Holman et al. |
| 7,102,172 B2 | 9/2006 | Lynch et al. |
| 7,108,396 B2 | 9/2006 | Swaris et al. |
| 7,114,827 B2 | 10/2006 | Halter |
| 7,125,143 B2 | 10/2006 | Hacker |
| 7,128,450 B2 | 10/2006 | Tiesler et al. |
| 7,131,226 B2 | 11/2006 | Gray et al. |
| 7,168,843 B2 | 1/2007 | Striebel |
| 7,172,324 B2 | 2/2007 | Wu et al. |
| 7,175,306 B2 | 2/2007 | Pan |
| 7,198,387 B1 | 4/2007 | Gloisten et al. |
| 7,221,104 B2 | 5/2007 | Lys et al. |
| 7,307,391 B2 | 12/2007 | Shan |
| 2005/0260766 A1 | 11/2005 | Paul et al. |
| 2005/0276053 A1 | 12/2005 | Nortrup et al. |
| 2006/0262544 A1 | 11/2006 | Piepgras et al. |
| 2006/0262545 A1 | 11/2006 | Piepgras et al. |
| 2006/0267028 A1 | 11/2006 | Lynch et al. |
| 2007/0247842 A1 | 10/2007 | Zampini et al. |
| 2007/0263393 A1 | 11/2007 | Van De Ven |

FOREIGN PATENT DOCUMENTS

| | | |
|---|---|---|
| CN | 2731252 Y | 10/2005 |

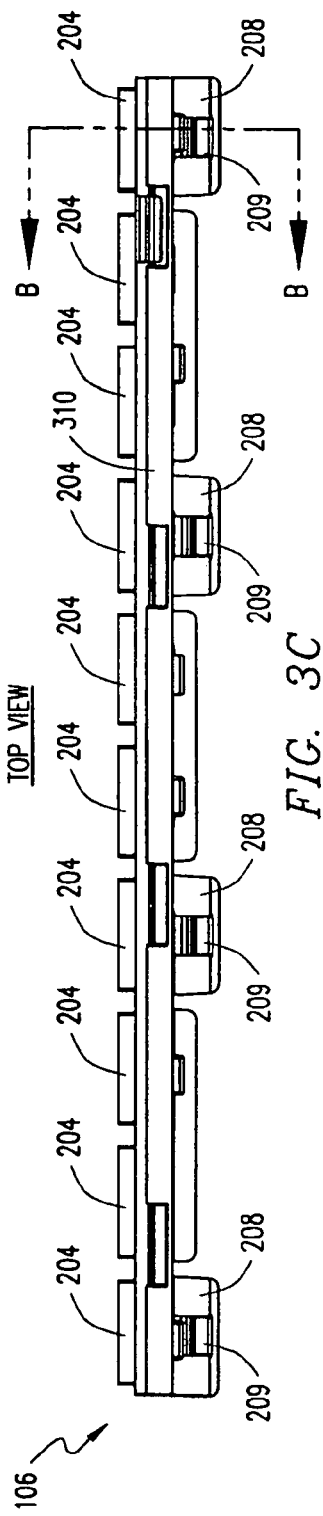
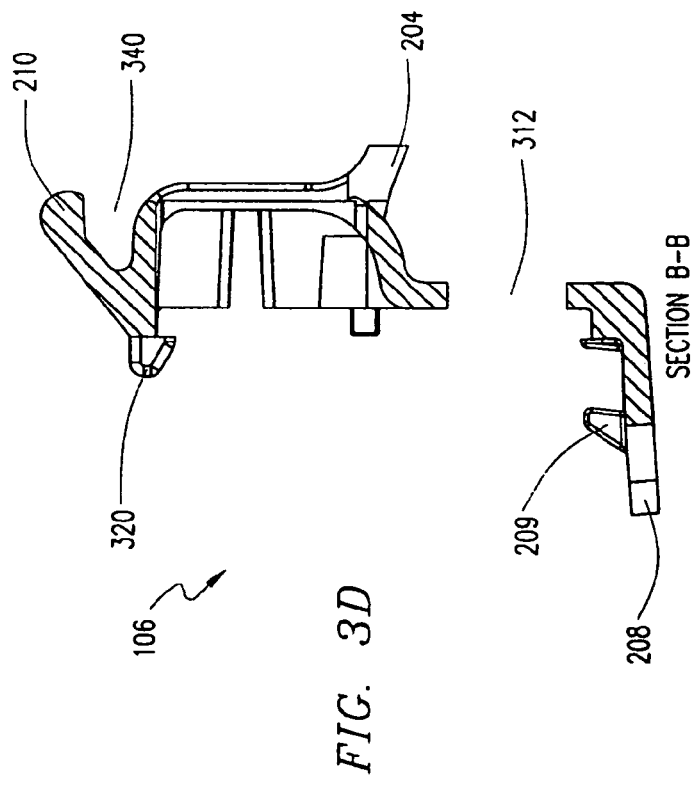
FIG. 3C
FIG. 3D

LIGHTING METHOD AND SYSTEM

CROSS-REFERENCE TO RELATED APPLICATIONS

This patent application claims priority from and incorporates by reference the entire disclosure of, U.S. Provisional Patent Application No. 60/927,218, filed May 2, 2007. This patent application also claims priority from and incorporates by reference the entire disclosure of U.S. Provisional Patent Application No. 61/047,882, filed Apr. 25, 2008.

BACKGROUND OF THE INVENTION

1. Field of the Invention

The present invention relates to methods of and systems for lighting and, more particularly, but not by way of limitation, to a LED lighting system for buses, trains, and the like affording improved lighting and simplifying maintenance and replacement of light sources therein.

2. History of Related Art

Commercial transportation vehicles have been accommodating the needs of passengers for well over a century. Of the passenger safety and comfort considerations addressed in designs of commercial transportation vehicles is the lighting system therein. Contemporary commercial vehicles such as buses utilize commercially available lighting fixtures for the safety and convenience of the bus passengers. These fixtures often incorporate conventional light technology such as fluorescent bulbs which inherently have certain functional, liability and safety considerations. These considerations include the fact that the lamps are manufactured with an electrical terminal on each end and, when installed into the lighting system, the electrical sockets block the light from the lamp. This can create dark spots within the lighted environment. An additional aspect is the fact that fluorescent lamps are manufactured and available in discrete sizes. Not all areas to be lighted are of the same size or are particularly adapted to the discrete sizes for which the lamps are manufactured. This design limitation also leads to dark areas in applications where the lamp needed for the lighting system is between the available lamp sizes.

Other safety considerations must also be considered. Fluorescent lamps operate on high voltage, alternating current which creates "arcing" within the lamp as part of the light generating process. Fluorescent lamps that have reached "end of life" do not generate light in any section of the entire lamp length, which creates large dark areas in the application environment. This fact also leads to the requirement for regular maintenance which is both costly and time consuming. An additional safety issue is the fact that fluorescent lamps contain mercury, argon or neon gas, and phosphor; which requires special disposal practices to prevent environmental issues. Likewise, if the lamp is broken within a contained environment, such as a bus, there are passenger safety issues and contamination aspects that must be dealt with.

Finally, fluorescent lamps, as described above, experience diminished operational life due to the application environment and increased repetitive on/off power cycling. This cycling increases the occurrence of lamp replacement and the opportunity for harm to personnel and environment, which may require the need for increased personnel training.

The disadvantages of fluorescent lights can be overcome with the use of the innovated light source system known as light emitting diodes (LEDs). Lighting systems based on LEDs have advantages over traditional fluorescent lighting systems, including the fact that they do not contain dangerous gasses and the fact that their operational life is not diminished by repetitive on/off power cycling.

Additionally, it has been recognized that LED lighting systems can be constructed in select lengths and lighting effects. For example, LED lighting systems can be controlled to vary both color and brightness to create subtle lighting effects, such as sunrise, sunset, and mood lighting, and as well as appropriate ambient lighting for reading and the like. Because of these and other advantages, LED lighting systems are rapidly replacing traditional fluorescent lighting systems in a number of environments, including transportation, military, commercial, and home environments.

Some LED lighting systems include lighting devices that can generate light of variable color and intensity under processor control. Multiple lighting devices of a modular design can be incorporated into lighting systems to illuminate larger areas. A lighting module may include, for example, groups of LEDs, each of which generates light of a different color and whose intensity can be controlled.

SUMMARY OF THE INVENTION

A lighting system including a light-emitting diode cradle securing at least one light-emitting diode and a modular unit comprising an arcuate portion, the arcuate portion comprising at least one diffusive reflective surface adapted to receive and reflect light from the at least one light-emitting diode. The lighting system further includes a diffusive transmissive element adapted to receive light reflected by the diffusive reflective surface and provide diffused light to an area requiring illumination.

A lighting system including a cradle securing at least one light-emitting element. The cradle includes a U-shaped groove, an elongate surface extending from the U-shaped groove, and a locking tab comprising an upwardly extending latch. The lighting system further includes a modular unit. The modular unit includes a mouth region receiving at least part of and achieving interlocking engagement with the cradle. The mouth region includes a first surface and a second surface oppositely disposed relative to the first surface and comprising a lip abutting and matingly engaging the U-shaped groove, the lip forming a track receiving the elongate surface. The modular unit further includes a neck region comprising a groove, the groove receiving and engaging the upwardly extending latch of the locking tab and an arcuate portion extending from the second surface and comprising a diffusive reflective surface receiving light from the at least one light-emitting element.

A method includes providing a cradle. The cradle includes a main body, a first outwardly extending elongate surface extending from a first side of the main body, a plurality of locking tabs extending from a second side of the main body, and a plurality of outwardly extending reflective tabs located adjacent each of a plurality of openings. The method further includes providing a modular unit. The modular unit includes an arcuate portion, a mouth region connected to the arcuate portion and comprising oppositely disposed first surface and second surfaces, a track formed between the second surface and a lip, and a neck region comprising a groove. The method further includes inserting the cradle into the modular unit via an opening between the arcuate portion and a surface extending downwardly from the groove, positioning the cradle so that a U-shaped groove of the cradle is above the lip, cantilevering the cradle against the surface until the first outwardly extending elongate surface of the cradle is positioned above the track, and applying pressure against the plurality of locking tabs towards the surface.

BRIEF DESCRIPTION OF THE DRAWINGS

A more complete understanding of the lighting method and system may be obtained by reference to the following Detailed Description when taken in conjunction with the accompanying Drawings wherein:

FIG. 3C is a top view of an LED cradle without an LED PWA mounted thereto;

FIG. 3D is a cross-sectional view of the LED cradle of FIG. 3C;

DETAILED DESCRIPTION OF ILLUSTRATIVE EMBODIMENTS OF THE INVENTION

Various embodiments of the present invention will now be described more fully with reference to the accompanying drawings. The invention may, however, be embodied in many different forms and should not be constructed as limited to the embodiments set forth herein; rather, the embodiments are provided so that this disclosure will be thorough and complete, and will fully convey the scope of the invention to those skilled in the art.

Despite the numerous potential benefits of LED lighting, implementation of LED lights into transportation vehicles has been suppressed due to difficulties accomplishing fast installation and replacement of LED printed wiring assembly (PWA). Known LED fixtures typically use multiple fasteners with a high density across the PWA in order to create uniform pressure on a thermal pad between the PWA and a heat sink.

With the introduction of LED-based light sources, improved light diffusion and ease of maintenance have become significant design goals. In addition, ease of replacement of the light sources and weight of the light sources have become increasingly important. Moreover, the use of improved reflecting surfaces and light-diffusing surfaces to provide human-friendly LED-based light often makes access to the mounting fasteners difficult and can significantly increase maintenance time.

Referring generally to various of the FIGURES, systems are shown that include a modular unit. The modular unit includes a reflective component. The systems also includes a diffusive transmissive element. The modular unit includes, in one embodiment, a receiving portion for receiving an LED cradle that holds a replaceable LED PWA. The LED cradle is adapted to lockably mount into the receiving portion of the modular unit so that sufficient pressure is applied against the LED PWA to permit adequate heat flow from the LED PWA through a thermal heat pad to a heat sink.

Figure 1:
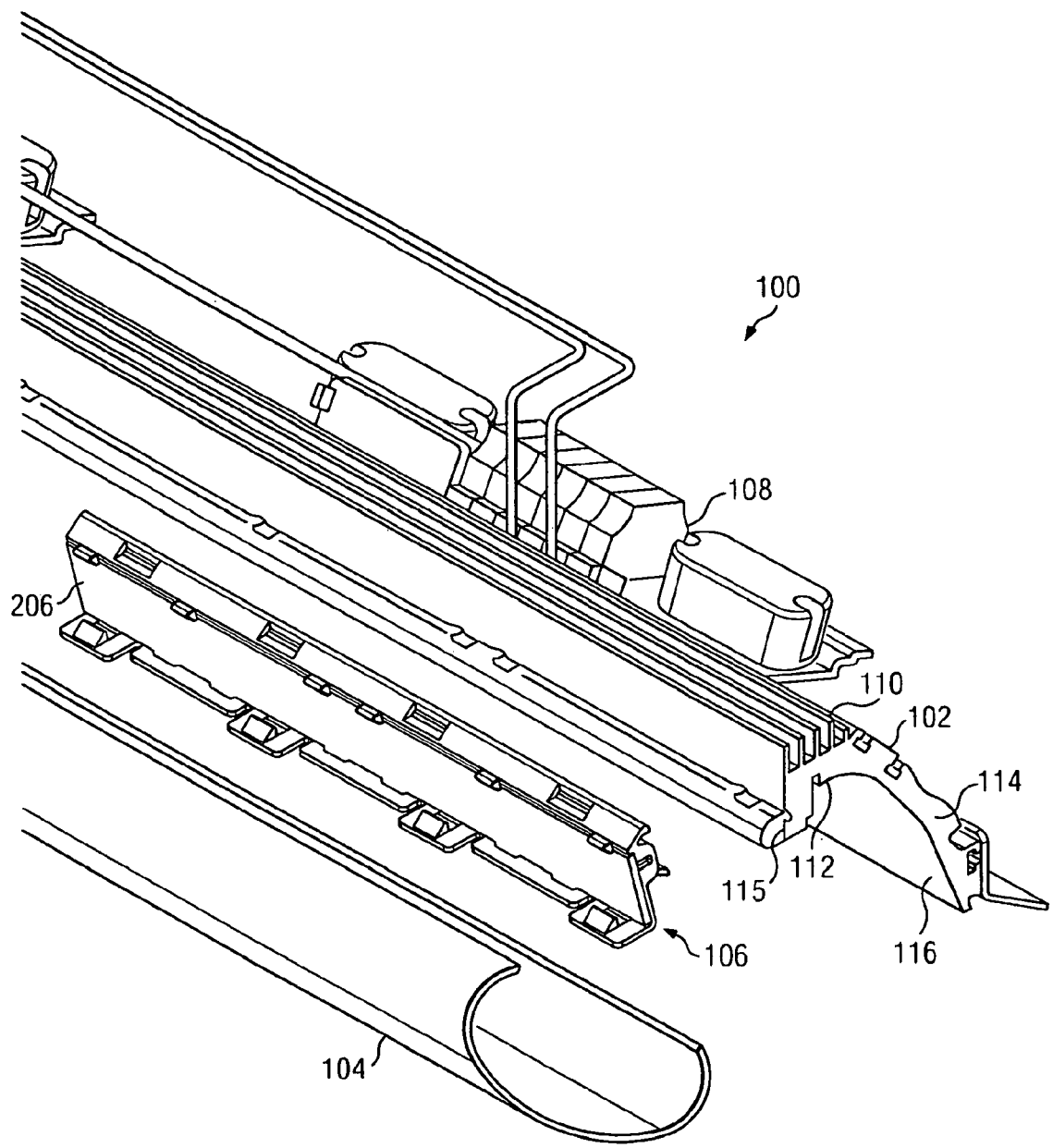
FIG. 1 is an exploded perspective view of an LED lighting system.

FIG. 1 is an exploded perspective view of an LED lighting system 100. The LED lighting system 100 includes a modular unit 102, a diffusive transmissive element 104, and an LED cradle 106. The LED cradle 106 is shown with a PWA 206 attached thereto and is adapted to be secured to the modular unit 102 along a track 112 formed in the modular unit 102. The LED lighting system 100 also includes circuitry 108 adapted to provide power to and control a plurality of LEDs (not explicitly shown) attached to the LED cradle 106. The circuitry 108 may be attached to the modular unit 102 permanently via fasteners such as, for example, rivets or screws.

The modular unit 102 is, in a typical embodiment, in the form of a unitary heat-conductive rigid material such as, for example, an extruded piece of aluminum. The modular unit 102 includes an arcuate portion 114 contiguous to and directly extending from a mouth region. In addition to the above, the modular unit 102 not only forms the arcuate portion 114, but also serves as a heat sink for the plurality of LEDs 202 and is a structural support component of the LED lighting system 100. The arcuate portion 114 includes a diffusive reflective surface 116. The diffusive reflective surface 116 is adapted to diffuse and reflect light emitted by the plurality of LEDs attached to the PWA 206 mounted to the LED cradle 106. In a typical embodiment, the LED cradle 106 is positioned along the track 112 of the modular unit 102 so that light output from the plurality of LEDs is directed onto the diffusive reflective surface 116 at an acute angle relative to a normal axis of a given point on the diffusive reflective surface 116. The LEDs are typically positioned on the PWA 206 so as to maximally illuminate the reflective diffusive surface 116.

Heat dissipation is typically a consideration when dealing with light sources; dissipation of heat generated by LEDs is no exception. The modular unit 102 includes a plurality of heat-dissipation fins 110 extending outwardly of the modular unit 102. The plurality of heat-dissipation fins 110 are adapted for thermal transfer from the LED cradle 106 when positioned along the track 112 of the modular unit 102. The modular unit 102 also includes a groove 115 running on an outer surface thereof. The groove 115 facilitates attachment of the LED cradle 106 to the modular unit 102.

The diffusive transmissive element 104 may be, for example, a lens or cover. In a typical embodiment, the diffusive transmissive element 104 is secured to the modular unit 102 via, for example, fasteners. In some embodiments, the diffusive transmissive element 104 is secured in a groove (not explicitly shown) of the modular unit 102 that runs along an inside edge the modular unit 102. The diffusive transmissive element 104 may be, for example, transparent or translucent and may be chosen for its light transmissive and diffusive properties.

The diffusive transmissive element 104, in a typical embodiment, achieves light diffusion and may be formed as a lens having inward-curving surfaces such as, for example, a concave lens. The diffusive transmissive element 104 may be in the form of a plastic lens body economically fabricated, for example, by extrusion molding to form a unitary piece. The diffusive transmissive element 104 in the illustrated embodiment serves to diffuse light emanating from the plurality of LEDs towards an area to be illuminated. The diffusive transmissive element 104 is also typically adapted to provide uniform illumination of a desired area. In a typical embodiment, the diffusive transmissive element 104 may possess light transmissivity of about 60% and angular scattering of ±20°.

In some embodiments, the diffusive transmissive element 104 may possess light transmissivity of greater than 80%.

In a typical application, it is necessary to have two surfaces on which light is incident in order to obtain adequate diffusion of light output by the LED lighting system 100 via angular scattering of light output by the plurality of LEDs 202. It has been found that a single surface a lens or a reflector) does not provide adequate diffusion in applications in which it is desired that individual ones of the plurality of LEDs 202 not be discernible by a user of the LED lighting system 100.

In a given application having an envelope (e.g., available space) within which to place the LED lighting system 100, a typical design objective is to place the two surfaces as far apart from one another as possible in order to maximize the diffusion of light originating at the plurality of LEDs 202 in order to make individual ones of the plurality of LEDs 202 not discernible by a user. The LED lighting system 100 takes advantage of this fact by utilizing the diffusive reflective surface 116 of the arcuate portion 114 and the diffusive transmissive element 104 rather than two diffusive transmissive elements 104. Use of the diffusive reflective surface 116 and the diffusive transmissive element 104 permits the distance between the two surfaces (i.e., the diffusive reflective surface 116 and the diffusive transmissive element 104) to be maximized within an envelope of minimal space.

The LED lighting system 100 permits much of the light emanating from the plurality of LEDs 202 to be diffused initially by the diffusive reflective surface 116. Light that is thus diffused by the diffusive reflective surface 116 strikes the diffusive transmissive element 104 and is diffused yet again, resulting in more diffusion via angular scattering and thus a smoother light output that, in effect, makes individual ones of the plurality of LEDs 202 indiscernible to a user of the LED lighting system 100.

Figure 2A:
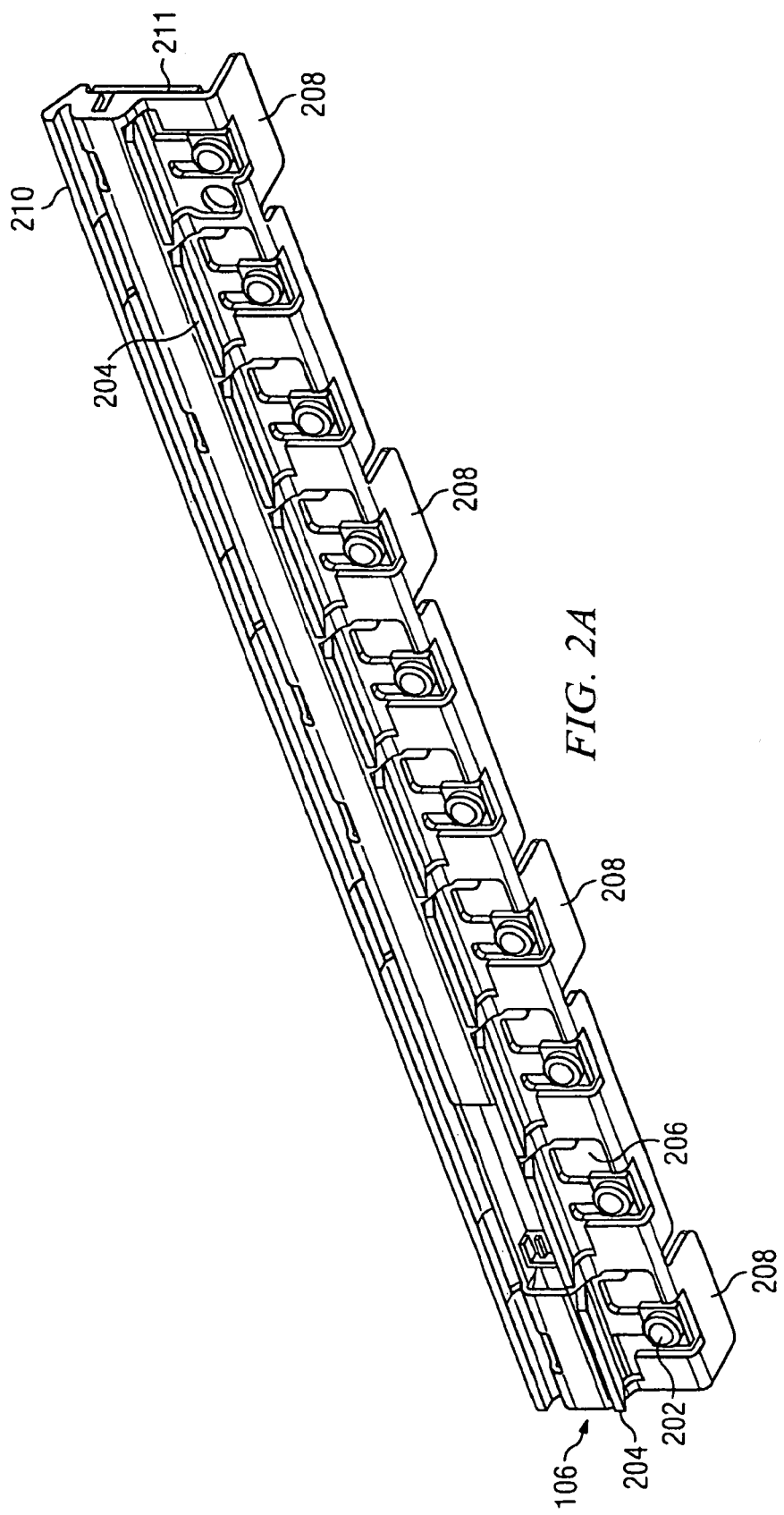
FIG. 2A is a front perspective view of an LED cradle with an LED Printed Wiring Assembly (PWA) mounted thereto.

FIG. 2A is a front perspective view of the LED cradle 106 with the LED PWA 206 mounted thereto. The LED cradle 106 is adapted to secure the plurality of LEDs 202 located on the PWA 206. The LED cradle 106 may be formed of a flexible material such as, for example, polycarbonate, plastic, or the like and is typically made of a unitary piece of material. In some embodiments, the LED cradle 106 may be formed of, for example, a non-flammable and non-toxic material. The plurality of LEDs 202 may emit any suitably colored light such as, for example, white, blue, green, red, yellow, amber, or orange. The PWA 206 accepts the mounting of the same color LEDs or accepts the mounting of different color LEDs.

The LED cradle 106 includes a main body 211 and a first outwardly extending elongate surface 210 extending from a first side of the main body 211. The elongate surface 210 is adapted to abut and matingly engage with the track 112 of the modular unit 102. The LED cradle 106 also includes a plurality of locking tabs 208 extending inwardly at a bottom of the LED cradle 106 and extending from a second side of the main body 211. The locking tabs 208 each include an upwardly extending latch 209 (shown in FIG. 2B) for engagement with the groove 115 of the modular unit 102. The LED cradle 106 also includes, in a typical embodiment, a plurality of outwardly extending reflective tabs 204 located above each of the plurality of LEDs 202. In other embodiment, the plurality of reflective tabs 204 may be replaced with a unitary outwardly extending surface for performing the same functions as the plurality of reflective tabs 204. The plurality of reflective tabs 204 are adapted to reflect and diffuse light emitted by the plurality of LEDs 202. The plurality of reflective tabs 204 may be formed of, for example, a white plastic or other material having reflective and diffusive properties. In other embodiments, the reflective tabs 204 may be painted with a reflective and diffusive material. In a typical embodiment, the plurality of reflective tabs 204 may have a reflectivity on the order of 90%. In other embodiments, the reflectivity may be much higher or much lower as design considerations dictate. The LED cradle 106 shown in FIG. 2A having 10 LEDs 202 mounted in the PWA 206 is for illustrative purposes only. The LED cradle 106 may be constructed of any length and may be adapted to accommodate any number of LEDs 202 in the PWA 206 as desired.

Figure 2B:
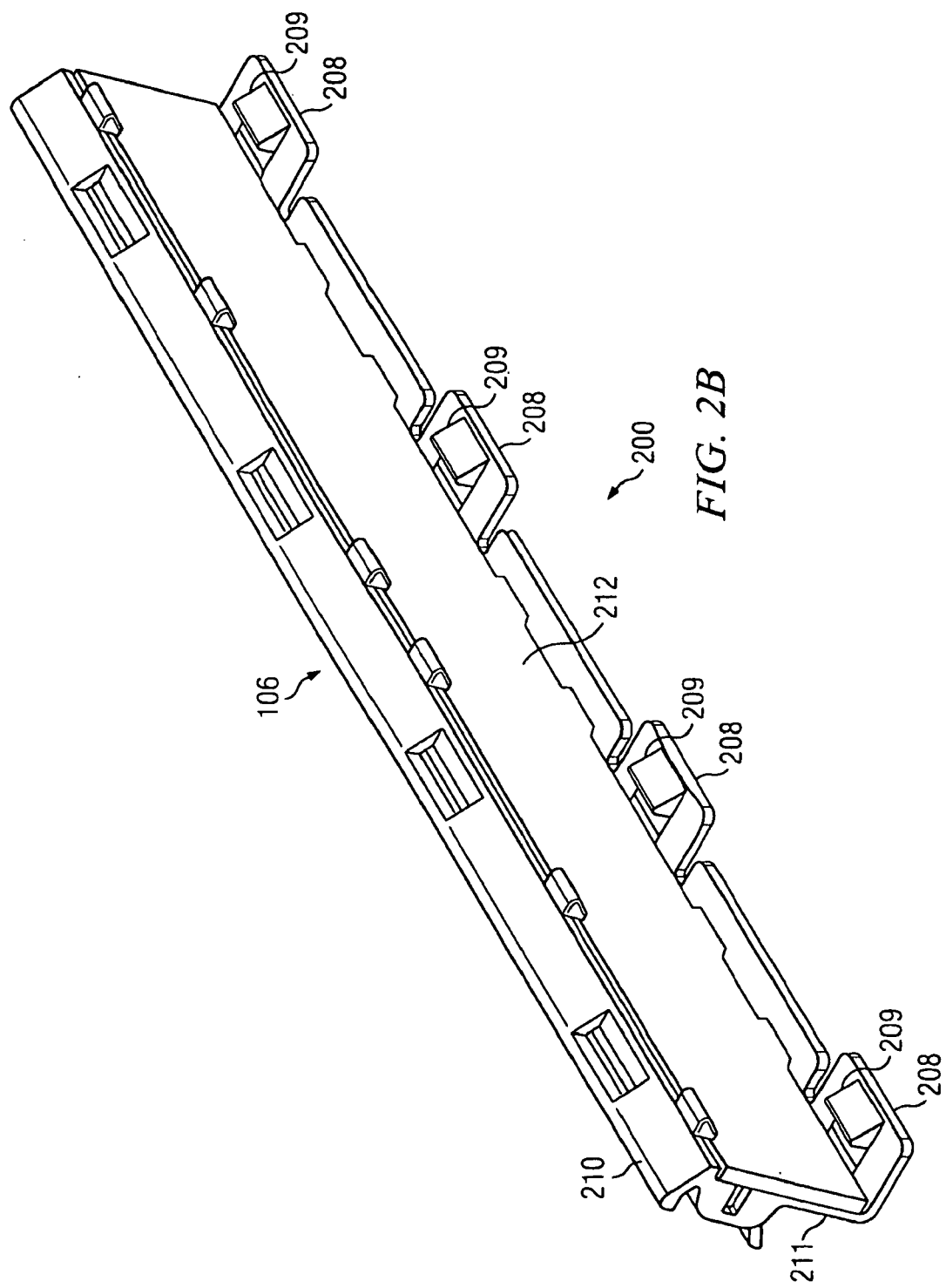
FIG. 2B is a back perspective view of an LED cradle with an LED PWA mounted thereto.

FIG. 2B is a back perspective view of the LED cradle 106 with the LED PWA 206 attached thereto. A thermal pad 212 is shown in contact with the LED PWA 206. The thermal pad 212 facilitates thermal conduction from the PWA 206 to the modular unit 102. As will be shown in more detail below, the thermal pad 212 is mounted so as to create a direct thermal path between the LED PWA 206 and the LED cradle 106. This direct thermal path facilitates heat dissipation and cooling of the LEDs 202. The LED cradle 106 is adapted to lockably mount into the modular unit 102 and provide sufficient pressure to permit heat flow from the LED PWA 206 through the thermal pad 212 to a heat sink such as, for example, the modular unit 102.

The thermal pad 212 may be formed of any suitable thermally conductive material. In some embodiments, the thermal pad 212 is a preformed solid. In a typical embodiment, the thermal pad 212 may be attached to a back side 240 of the LED PWA 206 before installation of the LED PWA 206. However, in some embodiments, the thermal pad 212 my be secured against the backside 240 of the LED PWA 206 during installation. In some embodiments, the thermal pad 212 is not a solid and may be, for example, a thermal grease applied to a back side of the LED PWA 206. The LED cradle 106 also includes the plurality of locking tabs 208. Each of the locking tabs 208 includes one upwardly extending latch 209 for engagement with the groove 115 of the modular unit 102.

Figure 3A:
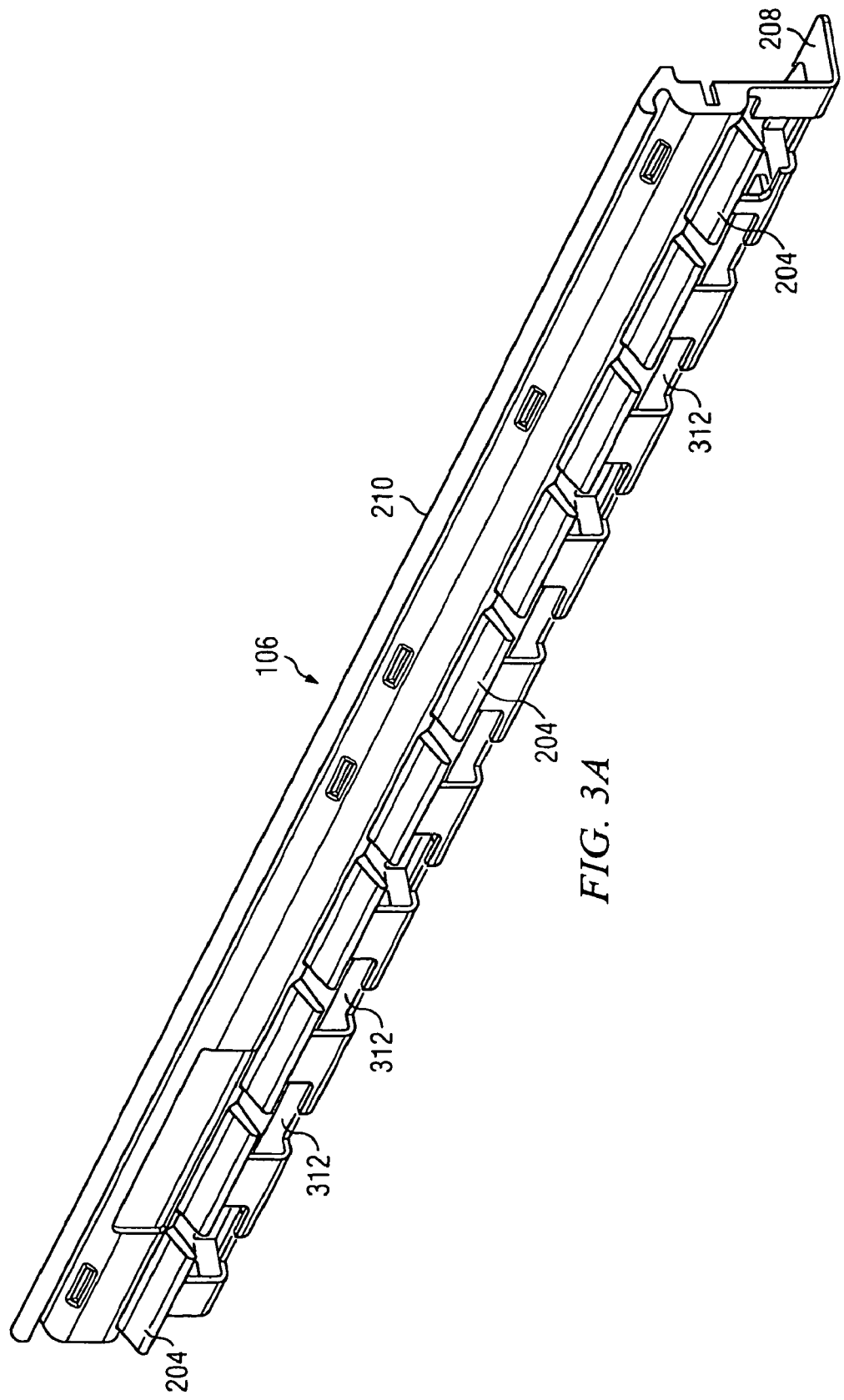
FIG. 3A is a front perspective view of an LED cradle without an LED PWA mounted thereto.

FIG. 3A is a front perspective view of the LED cradle 106 without the LED PWA 206 attached thereto. The LED cradle 106 includes the outwardly extending elongate surface 210. As noted above, the elongate surface 210 is adapted to abut and matingly engage with the track 112 of the modular unit 102. The LED cradle 106 also a plurality of openings 312 through which the plurality of LEDs 202 can pass and light emitted therefrom can be seen. The LED cradle 106 also includes the plurality of outwardly extending reflective tabs 204 located above each of the plurality of openings 312. The plurality of reflective tabs 204 are adapted to reflect and diffuse light from the plurality of LEDs 202.

Figure 3B:
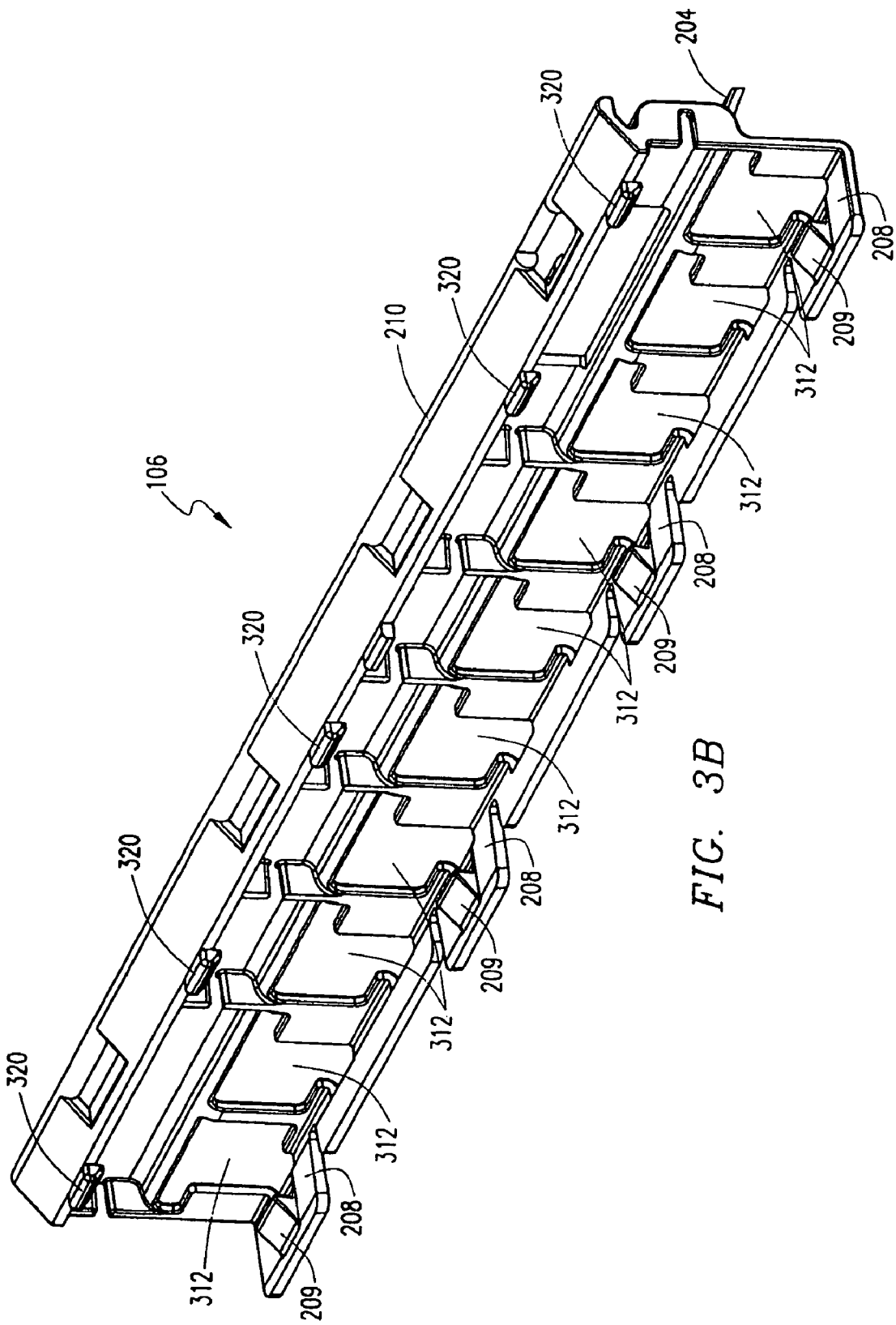
FIG. 3B is a back perspective view of an LED cradle without an LED PWA mounted thereto.

FIG. 3B is a back perspective view of the LED cradle 106 without the LED PWA 206 attached thereto. In this view of the LED cradle 106, the LED PWA 206, the plurality of LEDs 202, and the thermal pad 212 are not shown. The plurality of reflective tabs 204 are adapted to reflect and diffuse light emitted by the plurality LEDs 202. In various embodiments, the reflective tabs 204 may include, for example, a white plastic or other material having reflective and/or diffusive properties. In some embodiments, the reflective tabs 204 may be painted with a reflective or diffusive material.

The LED cradle 106 has formed therein the plurality of openings 312 through which the LEDs 202 can pass and light emitted therefrom can be seen. The LED cradle 106 also includes the plurality of inwardly extending locking tabs 208. The locking tabs 208 each include an upwardly extending latch 209. The locking latches 209 engage with the groove 115 of the modular unit 102. The LED cradle 106 also includes a plurality of locking latches 320 on an upper portion of the LED cradle 106. The plurality of locking latches 320 may be, for example, tabs for securing an upper end of the LED PWA 206 to the LED module 106.

FIG. 3C is a top view of the LED cradle 106 without the LED PWA 206 attached thereto. This view illustrates, among other things, the plurality of outwardly extending reflective tabs 204. The plurality of inwardly extending locking tabs 208 at a bottom of the LED cradle 106 are also illustrated. Each of the locking tabs 208 includes one of the latches 209 for mating engagement with the groove 115.

FIG. 3D is a cross-sectional view of the LED cradle 106. In this view, which is along line B-B of FIG. 3C, the cross section is taken of the LED cradle 106 through one of the openings 312 through which the LEDs 202 pass. FIG. 3D also illustrates the outwardly extending elongate surface 210, the outwardly extending reflective tabs 204, and a U-shaped groove 340 formed between the elongate surface 210 and the reflective tab 204. The U-shaped groove 340 is adapted to abut and matingly engage with a lip region (shown in FIG. 5) of the modular unit 102. FIG. 3D also illustrates one of the openings 312 through which one of the LEDs 202 passes. One of the locking latches 320 is also illustrated. The locking latch 320 shown may be, for example, a tab for securing an upper end of the LED PWA 206 to the LED cradle 106. FIG. 3D also illustrates at least one of the locking tabs 208, which extends inwardly at a bottom of the LED cradle 106. The locking tabs 208 include the upwardly extending latch 209 for engagement with the groove 115 of the modular unit 102.

Figure 4:
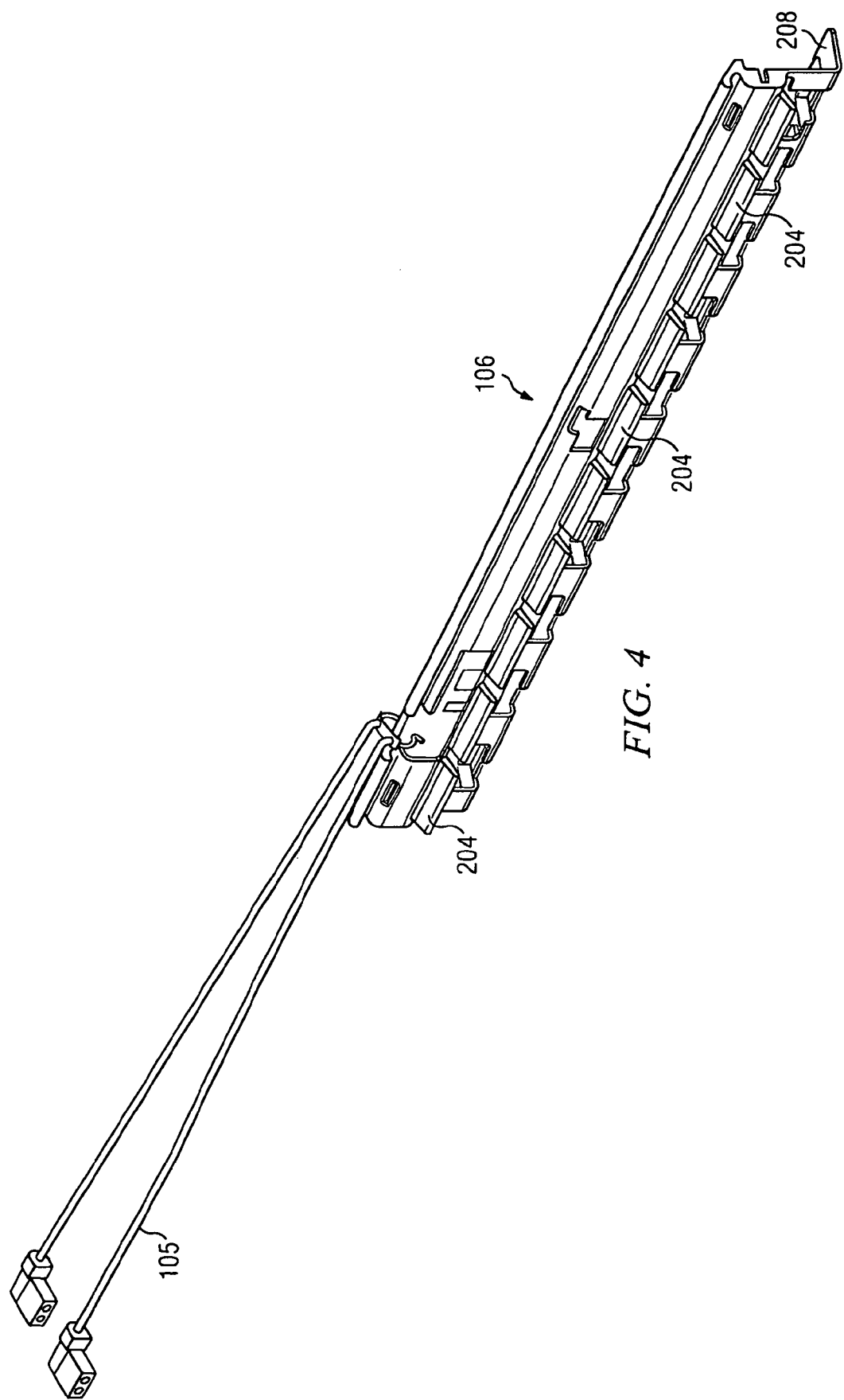
FIG. 4 is a front perspective view of an LED cradle with connectors attached thereto.

FIG. 4 is a front perspective view of the LED cradle 106 with connectors 105 attached. The connectors 105 are used to connect the LED cradle 106 with the circuitry 108. The circuitry 108 is used to provide power to the plurality of LEDs 202 and to provide control of the plurality of LEDs 202.

Figure 5:
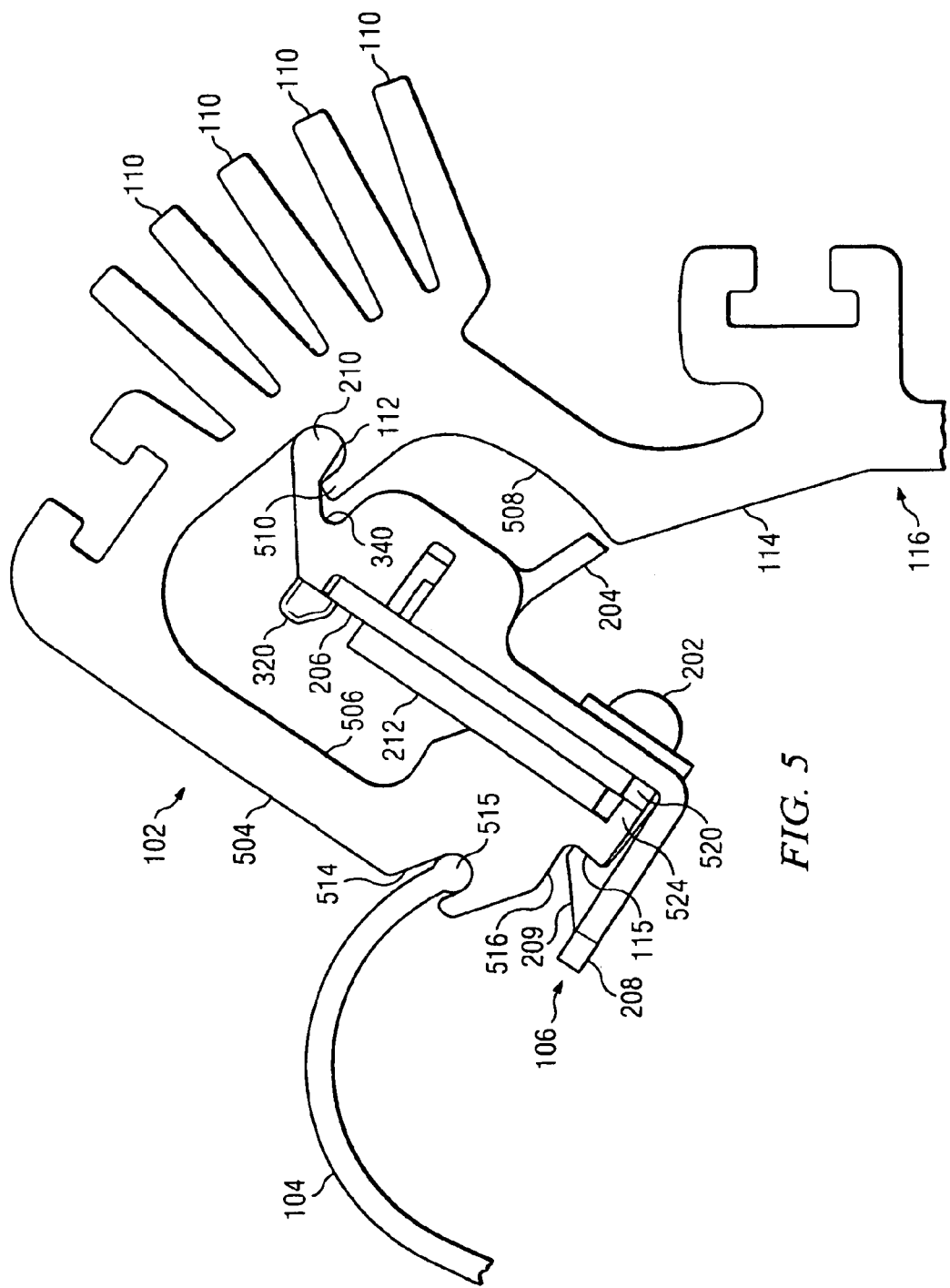
FIG. 5 is an enlarged side view of an LED lighting system.

FIG. 5 is an enlarged side view of the LED lighting system 100. From this view, it can be seen that the LED cradle 106 is adapted so that the LED PWA 206 fits against a backside 520 of the LED cradle 106. In the embodiment shown, a portion of one of the LEDs 202 can be seen extending through the LED cradle 106. In some embodiments, the LED 202 may not extend outwardly through the LED cradle 106.

The modular unit 102 is, in a typical embodiment, in the form of a unitary extruded piece of aluminum housing 502. The modular unit 102 includes the arcuate portion 114 contiguous to and directly extending from a mouth region 504. The mouth region 504 is formed with a pair of oppositely disposed, generally J-shaped, surfaces 506 and 508. The oppositely disposed J-shaped surfaces 506 and 508 are adapted for receiving a portion of the LED cradle 106 therein for interlocking engagement therewith. The J-shaped surface 508 includes a lip 510 extending therefrom forming the track 112 therebetween. The track 112 may be, for example, a mounting cavity for receiving the elongate surface 210 of the LED cradle 106. Furthermore, the lip 510 is adapted to abut and matingly engage the U-shaped groove 340 of the LED cradle 106. The housing 502 also includes a mounting cavity 514 on an outside surface thereof. The mounting cavity 514 is adapted to receive an elongate surface 515 of the diffusive transmissive element 104 for interlocking engagement therewith. The housing 502 also includes a neck region having the groove 115 and a surface 524 extending downwardly from the groove 115. The groove 115 is adapted to receive and engage the upwardly extending latches 209 of the locking tabs 208.

The arcuate portion 114 includes the diffusive reflective surface 116. In a typical embodiment, the LED cradle 106 is positioned along the track 112 of the housing 502 so that light emitted from the plurality of LEDs 202 is directed onto the diffusive reflective surface 116 at an acute angle relative to a normal axis of a given point on the diffusive reflective surface 116. In a typical embodiment, the diffusive reflective surface 116 may be formed of, for example, a white plastic or other material having reflective qualities. In other embodiments, the diffusive reflective surface 116 may be painted with a reflective material. The diffusive reflective surface 116 is adapted to diffuse and reflect light emitted by the plurality of LEDs 202. In a typical embodiment, the diffusive reflective surface 116 should exhibit reflectivity of incident light that is as great as possible. However, it is often the case that materials or coatings that provide maximal reflectivity are cost prohibitive. Therefore, in many applications, a minimal acceptable reflectivity such as, for example, 60±15% is employed. The greater the reflectivity exhibited by the diffusive reflective surface 116, the fewer LEDs 202 necessary or the less power needed to drive the LEDs 202.

The LEDs are typically mounted in a pattern in order to maximally illuminate the diffusive reflective surface 116. To further improve light output of the modular unit 102, the LED cradle 106 also includes the plurality of outwardly extending reflective tabs 204 located above each of the plurality of LEDs 202. The plurality of reflective tabs 204 are adapted to reflect and diffuse light emitted by the LEDs 202. In various embodiments, the reflective tabs 204 may include, for example, a white plastic or other material having reflective qualities. In some embodiments, the reflective tabs 204 may be painted with a reflective material.

The housing 502 also includes the plurality of heat-dissipation fins 110 extending outwardly therefrom. The plurality of heat-dissipation fins 110 are adapted for thermal transfer from the LED cradle 106 positioned along the track 112 of the modular unit 102.

The thermal pad 212 is shown pressed against the LED PWA 206 for thermal conduction from the PWA 206 to the modular unit 102. The thermal pad 212 is mounted in such a way so as to create a direct thermal path between the LED PWA 206 and the modular unit 102. This direct thermal path facilitates heat dissipation and cooling for the plurality of LEDs 202. The LED cradle 106 is adapted to lockably mount into the modular unit 102 and provide sufficient pressure to permit heat flow from the LED PWA 206 through the thermal pad 212 to a heat sink such as, for example, the modular unit 102. In other embodiments, the LCD cradle 106 may be attached to the modular unit 102 permanently via fasteners such as, for example, rivets or screws.

Figure 6:
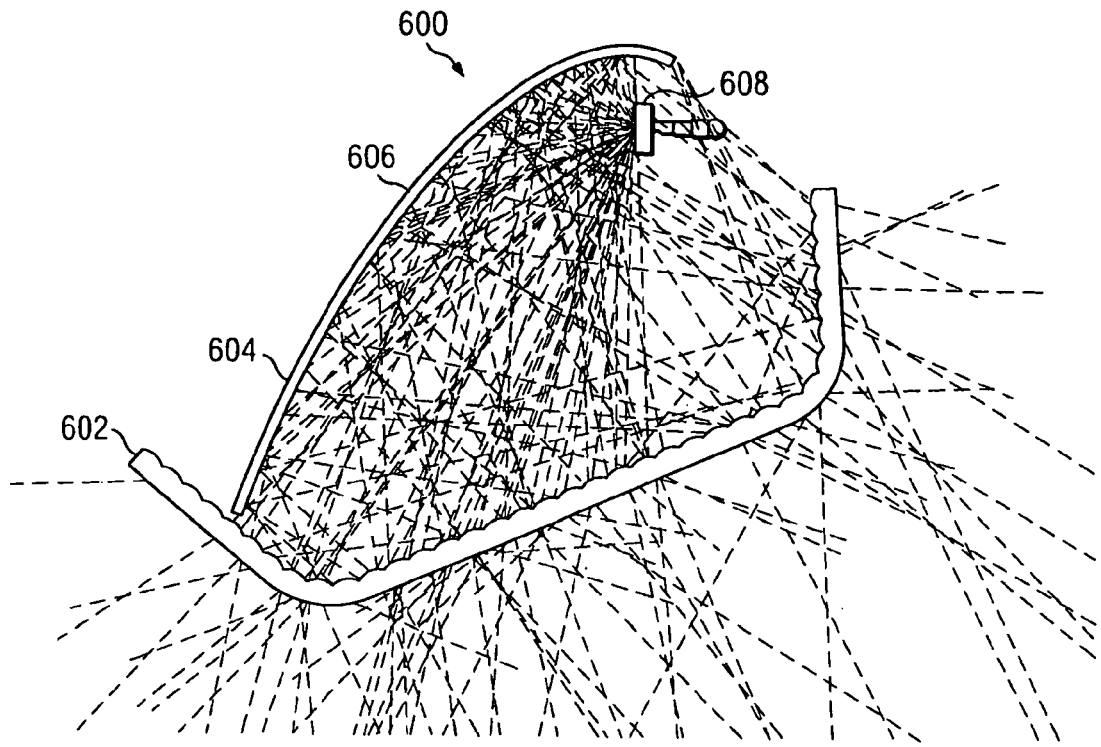
FIG. 6 is a partial cross-section of an LED lighting system showing reflective and refractive properties thereof.

FIG. 6 is a partial cross-section of an LED lighting system showing reflective and refractive properties thereof. The LED lighting system 600 includes a diffusive transmissive element 602, an arcuate portion 604 of the modular unit having a diffusive reflective surface 606, and an LED 608. The LED 608 emits light in an approximately cone-shaped pattern that ranges from approximately 0 to approximately 90 degrees relative to a primary direction in which the LED 608 is aimed. Various rays of emitted light are illustrated in FIG. 6 to demonstrate the reflective and diffusive (i.e., scattering) properties of the diffusive reflective surface 606 of the arcuate portion 604 and the transmissive and scattering properties of the diffusive transmissive element 602. It will thus be apparent that the combination of the diffusive transmissive element 602 and the arcuate portion 604 having the diffusive reflective surface 606 results in a smoothing effect of light passing through the diffusive transmissive element 602 and visible to a user.

In a typical embodiment, the diffusive transmissive element 602 should exhibit as great transmissivity of light as possible. However, in many cases, transmissivity of the diffusive transmissive element 602 and diffusive properties of the diffusive transmissive element 602 are, to at least some degree, inversely related. In other words, in a typical embodiment, the greater the transmissivity of the diffusive transmissive element 602, the less the diffusive properties of the diffusive transmissive element 602. In at least one embodiment, it has been demonstrated that no greater than 60% transmissivity is permissible for the diffusive transmissive element 602 in order to obtain adequate diffusion of light in order to make individual ones of the plurality of LEDs 202 imperceptible to a user.

In addition to the above, in a typical embodiment, an angle of scattering of at least ±20 degrees relative to an incident ray of light is an acceptable property of the diffusive transmissive element 602. In other words, in a typical embodiment, light incident on the diffusive transmissive element 602 is scattered within a cone of up to 20 degrees from the angle at which the incident ray of light struck the diffusive transmissive element 602.

Figure 7:
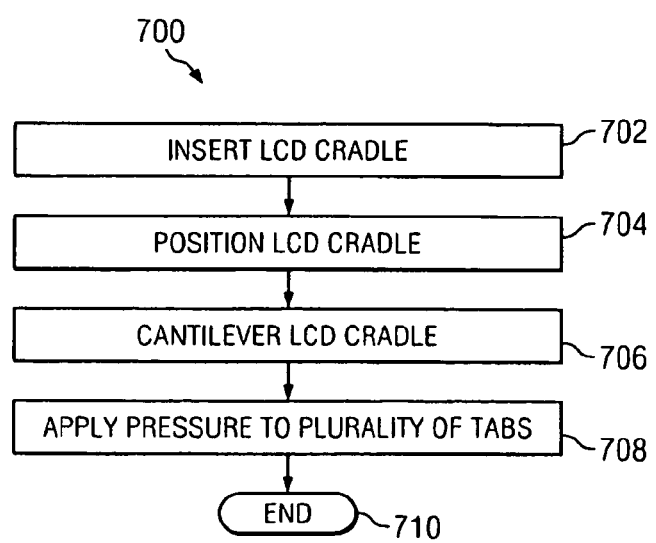
FIG. 7 is a flow diagram illustrating a process of engaging an LED cradle with a modular unit.

FIG. 7 is a flow diagram illustrating a process 700 of engaging the LED cradle 106 with the modular unit 102. At step 702, the LED cradle 106 is inserted into the modular unit 102 via an opening formed between the arcuate portion 114 and the surface 524 extending downwardly from the groove 115 of the modular unit. At step 704, the LED cradle 106 is positioned so that the U-shaped groove 340 of the LED cradle 106 is above the lip 510 of the modular unit 102. At step 706, the LED cradle 106 is cantilevered against the surface 524 until the elongate surface 210 of the LED cradle 106 is positioned above the track 112 formed between the J-shaped surface 508 and the lip 510 of the modular unit 102. At step 708, pressure is applied against the plurality of locking tabs 208 towards the surface 524 until the plurality of locking tabs 208 are in contact with the surface 524 of the modular unit and the plurality of upwardly extending latches 209 overlap the groove 115, the lip 510 of the modular unit 102 matingly engages the U-shaped groove 340 of the LED cradle 106, and elongate surface 210 of the LED cradle 106 is received within the track 112 of the modular end. At step 710, the process ends.

Although various embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth herein.

What is claimed is:

1. A lighting system comprising:
   a light-emitting diode cradle securing at least one light-emitting diode;
   a modular unit comprising an arcuate portion, the arcuate portion comprising at least one diffusive reflective surface adapted to receive and reflect light from the at least one light-emitting diode;
   a diffusive transmissive element;
   wherein the light-emitting diode cradle is positioned relative to the modular unit so that light output from the at least one light-emitting diode is directed onto the at least one diffusive reflective surface at an acute angle relative to a normal axis of a given point on the at least one diffusive reflective surface to provide diffused light; and
   wherein the diffused light strikes the diffusive transmissive element for additional diffusion via angular scattering resulting in a smoother light output to an area requiring illumination and results in the at least one light-emitting diode to be completely concealed when viewed from the area requiring illumination.

2. The system of claim 1, wherein the light-emitting diode cradle further comprises:
   a main body having at least one opening for receiving the at least one light-emitting diode;
   a first outwardly extending elongate surface extending from a first side of the main body and engaging with a track of the modular unit;
   a plurality of locking tabs extending from a second side of the main body;
   wherein each locking tab of the plurality of locking tabs comprises an upwardly extending latch for engaging a groove of the modular unit; and
   a plurality of outwardly extending reflective tabs located adjacent each of the plurality of openings.

3. The system of claim 2, wherein the plurality of outwardly extending reflective tabs reflect and diffuse light emitted by the at least one light-emitting diode onto the at least one diffusive reflective surface.

4. The system of claim 3, wherein the plurality of outwardly extending reflective tabs are painted with a reflective and diffusive material.

5. The system of claim 1, wherein the modular unit further comprises:
   a mouth region connected to the arcuate portion and comprising a first surface and a second surface;
   wherein the first and second surfaces are oppositely disposed;
   a track formed between the second surface and a lip;
   a mounting cavity receiving the diffusive transmissive element on an outside surface of the modular unit; and
   a neck region comprising a groove interfacing with a portion of the light-emitting diode cradle.

6. The system of claim 5, wherein the first and second surfaces are generally J-shaped.

7. The system of claim 1, wherein the diffusive transmissive element comprises a lens having inward-curving surfaces toward the at least one light-emitting diode.

8. The system of claim 1, wherein the diffusive transmissive element is adapted to provide light transmissivity of about 60% and angular scattering of about +/−20 degrees.

9. The system of claim 1, wherein the modular unit is formed of a unitary heat-conductive rigid material.

10. The system of claim 9, wherein the heat-conductive rigid material comprises aluminum.

11. The system of claim 1, wherein the at least one diffusive reflective surface is painted with a reflective material.

12. The system of claim 1, wherein the at least one diffusive reflective surface is adapted to provide light reflectivity of about 60%.

13. A lighting system comprising:
   a cradle securing at least one light-emitting element, the cradle comprising:
      a U-shaped groove;
      an elongate surface extending from the U-shaped groove; and
      a locking tab comprising an upwardly extending latch;
   a modular unit comprising:
      a mouth region receiving at least part of and achieving interlocking engagement with the cradle, the mouth region comprising:
      a first surface;
      a second surface oppositely disposed relative to the first surface and comprising a lip abutting and matingly engaging the U-shaped groove, the lip forming a track receiving the elongate surface;

a neck region comprising a groove, the groove receiving and engaging the upwardly extending latch of the locking tab; and an arcuate portion extending from the second surface and comprising a diffusive reflective surface receiving light from the at least one light-emitting element; and wherein the at least one light-emitting element is completely concealed when viewed from an area requiring illumination.

14. The lighting system of claim 13, further comprising:
a plurality of openings for receiving the at least one light-emitting diode; and
a plurality of outwardly extending reflective tabs located adjacent each of the plurality of openings.

15. The lighting system of claim 14, wherein the plurality of outwardly extending reflective tabs are adapted to reflect and diffuse light emitted by the at least one light-emitting diode onto the diffusive reflective surface.

16. The lighting system of claim 15, wherein the plurality of outwardly extending reflective tabs are painted with a reflective and diffusive material.

17. The lighting system of claim 13, wherein the modular unit is formed of a unitary heat-conductive rigid material.

18. The lighting system of claim 17, wherein the heat-conductive rigid material comprises aluminum.

19. The lighting system of claim 13, wherein the cradle is positioned relative to the modular unit so that light output from the at least one light-emitting element is directed onto the diffusive reflective surface at an acute angle relative to a normal axis of a given point on the diffusive reflective surface.

20. A method comprising:
providing a cradle for securing at least one light-emitting element, the cradle comprising:
a main body;
a first outwardly extending elongate surface extending from a first side of the main body;
a plurality of locking tabs extending from a second side of the main body;
a plurality of outwardly extending reflective tabs located adjacent each of a plurality of openings; and
a groove formed between the first outwardly extending elongate surface and the plurality of outwardly extending reflective tabs;
providing a modular unit comprising:
an arcuate portion;
a mouth region connected to the arcuate portion and comprising oppositely disposed first surface and second surfaces;
a track formed between the second surface and a lip; and
a neck region comprising a groove;
inserting the cradle into the modular unit via an opening between the arcuate portion and a surface extending downwardly from the groove;
positioning the cradle so that the groove of the cradle is above the lip;
cantilevering the cradle against the surface extending downwardly from the groove until the first outwardly extending elongate surface of the cradle is positioned above the track;
applying pressure against the plurality of locking tabs towards the surface; and
wherein the at least one light-emitting element is completely concealed when viewed from an area requiring illumination.

* * * * *